United States Patent [19]

Kashioka et al.

[11] 4,288,816
[45] Sep. 8, 1981

[54] COMPRESSED IMAGE PRODUCING SYSTEM

[75] Inventors: Seiji Kashioka, Hachioji; Yoshihiro Shima, Kokubunji; Takafumi Miyatake, Tokorozawa, all of Japan; Masakazu Ejiri, San Jose, Calif.; Osamu Obata, Takasaki, Japan

[73] Assignee: Hitachi, Ltd., Tokyo, Japan

[21] Appl. No.: 897,133

[22] Filed: Apr. 17, 1978

[30] Foreign Application Priority Data

Apr. 18, 1977 [JP] Japan .................................. 52-43554

[51] Int. Cl.³ ............................................... H04N 7/12
[52] U.S. Cl. .......................... 358/138; 340/146.3 MA
[58] Field of Search ............ 358/138; 340/146.3 MA, 340/146.3 AG

[56] References Cited

U.S. PATENT DOCUMENTS

| | | | |
|---|---|---|---|
| 3,499,980 | 3/1970 | Smierciak | 358/138 |
| 3,887,762 | 6/1975 | Uno et al. | 358/106 |
| 4,014,000 | 3/1977 | Uno et al. | 340/146.3 MA |

*Primary Examiner*—Joseph A. Orsino, Jr.
*Attorney, Agent, or Firm*—Craig and Antonelli

[57] ABSTRACT

A compressed image producing system is disclosed which comprises a buffer memory unit including a plurality of cascade-connected shift register stages to which image signals time-sequentially produced by the conversion of the respective picture elements of an image into the corresponding binary signals through the scanning of the image are successively applied, a partial image extracting unit including a plurality of registers which take in the image signals from the shift register stages respectively and parallely delivers the image signals bit by bit, and a sampling pulse generating circuit which generates sampling pulses at predetermined intervals. The respective shift registers of the buffer memory perform their data shift operations in response to the sampling pulses to intermittently take in the image signals so that sampling point data corresponding to the scanning lines in number are stored in each register and a plurality of compressed images constructed by different groups of the sampling points are continuously produced through the shifting of the image extracting position.

6 Claims, 28 Drawing Figures

U.S. Patent   Sep. 8, 1981   Sheet 1 of 10   4,288,816
FIG. IA
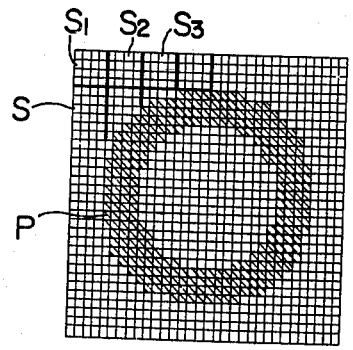
FIG. IB
FIG. IC
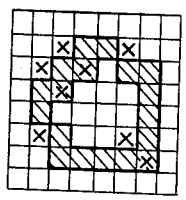
FIG. ID
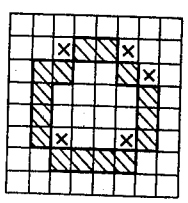
FIG. IE
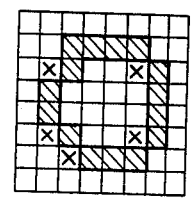
FIG. IF
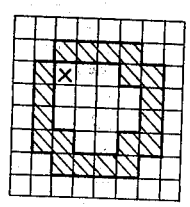
FIG. IG
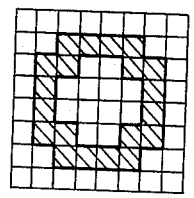

FIG. 5A
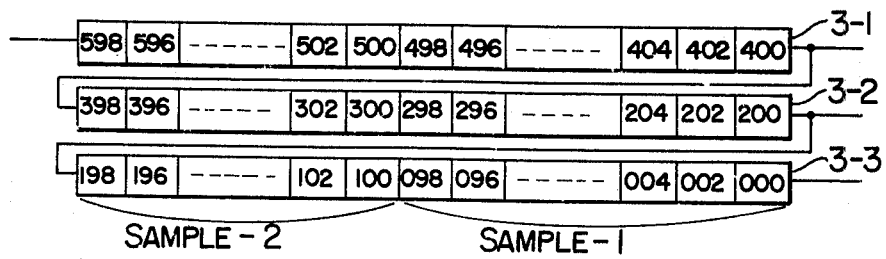
FIG. 5B
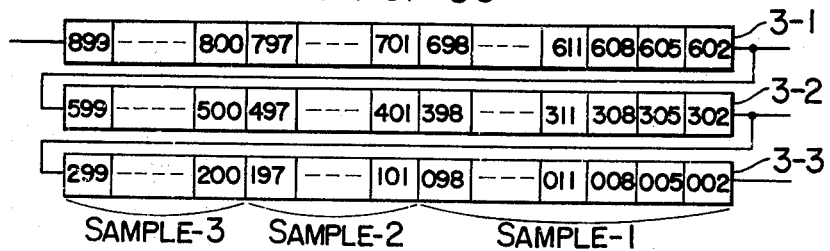
FIG. 5C
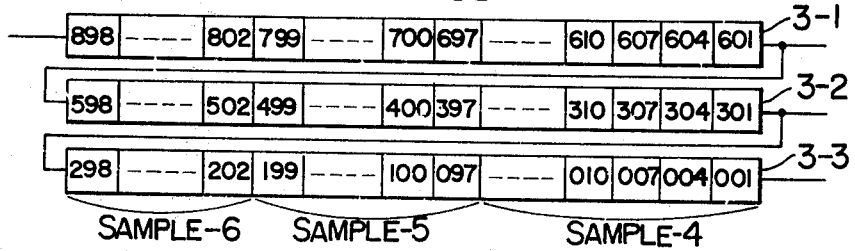
FIG. 5D

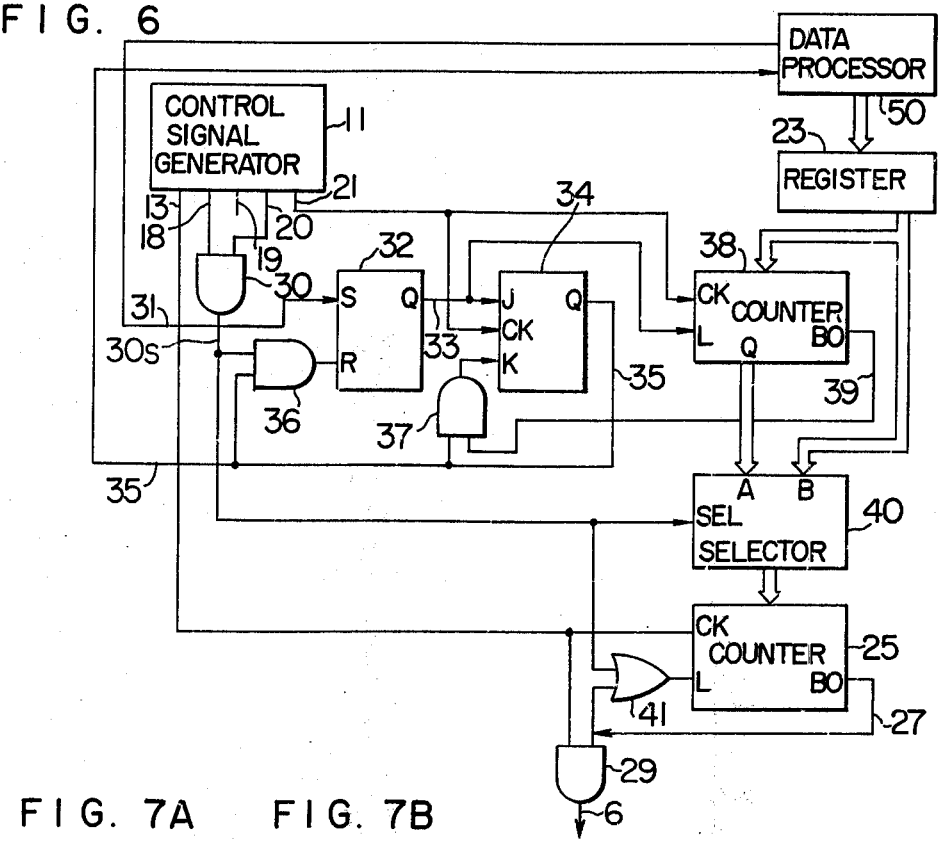

COMPRESSED IMAGE PRODUCING SYSTEM

This invention relates to a pattern recognition system and more particularly to a system in which signals relating to the respective sampling points allotted on an original image at predetermined intervals are selected from time-sequentially or one-dimensionally produced image signals and the sampling point related signals are two-dimensionally rearranged to successively produce compressed images.

Conventionally, for the recognition of patterns such as characters, the investigation of specific patterns or the search for positions, the parallel processing of signals relating to the respective sampling points taken on an original image at proper intervals is often performed. A typical example is the identification and matching with a dictionary pattern or the detection of some specific patterns, as disclosed in Japanese Patent Publication No. 12492/76 and U.S. Pat. No. 3,887,762. In such a case, if a scanning type input device such as a TV camera or a raster scanning input apparatus is used, it is required that a part of the input image signals produced serially or time-sequentially from the input device is reconstructed in a two-dimensional arrangement and signals so reconstructed are derived parallely in order to extract at least a part of the original image. In many applications, the extracted partial image is continuously shifted to cover the entire original image and the above-described processing is performed on each partial image. The rate of the shifting of the partial image can be the same as the scanning rate of the input device. Alternatively, the former may be different from the latter in the case where the image is stored temporarily. The following description is made with respect to the case where the former is the same as the latter.

In order to facilitate the recognition of a pattern, it is convenient to use a two-dimensionally compressed pattern in which partial images extracted from the image obtained by an image pickup device are reconstructed by the sampling points allotted on the original image at predetermined intervals. In the case where the compressed pattern obtained by the sampling is used for matching with a reference pattern, there often arises a problem that since the pattern observed by the image pickup device may be not regularly positioned the compressed pattern will have an untolerable distortion in dependence upon the selection of the sampling points so that the matching with the reference pattern is difficult. For example, in the recognition of characters, there are many cases where some characters has unpredictable deviations from their proper positions. In the detection of pattern positions, it is naturally the case that such deviations can be by no means predicted. Therefore, it often happens that in the character recognition a sufficient coincidence cannot be obtained with a dictionary pattern and in the pattern position detection a similar or incorrect pattern may be detected.

Accordingly, one object of this invention is to provide a compressed image producing system which can produce compressed patterns having no distortion.

Another object of this invention is to provide a compressed image producing system in which compressed patterns constructed by different groups of sampling points can be continuously extracted through an optimum sampling.

According to one aspect of this invention, there is provided a compressed image producing system comprising: first means for converting a two-dimensional image into one-dimensionally arranged image signals and delivering them; second means for successively storing predetermined amounts of said image signals delivered from said first means; third means for taking in a part of said image signals stored in said second means to parallelly deliver two-dimensionally rearranged image signals; and fourth means for controlling the input of said image signals from said first means to said second means so that the image signals relating to plural sets of sampling points allotted on said two-dimensional image are successively supplied to said second means, the respective sampling point sets having different sampling start positions and the sampling points of each set being allotted on said two-dimensional image at predetermined intervals.

According to another aspect of this invention, there is provided a compressed image producing system comprising: first means for successively scanning a two-dimensional image to convert the image information on the respective scanning lines into one-dimensionally arranged image signals; second means for the temporary storage of said image signals including a plurality of data storages connected to that said image signals supplied from said first means to the data storage of the first stage are sequentially shifted to the data storages of the following stages; third means for the reconstruction of a two-dimensional image including a plurality of shift registers provided corresponding to said data storages, said shift registers taking in said image signals from the corresponding data storages in accordance with the input order thereof to parallely deliver plural-bit image signals; and fourth means for sampling said image signals from said first means at a predetermined sampling interval for the supplying thereof to said second means, whereby said data storages store the image signals relating to plural groups of picture elements of said one-dimensional image and sampled through the different scanning lines and these image signals are periodically delivered from said third means.

According to a further aspect of this invention, there is provided a compressed image producing system comprising: first means for successively scanning a two-dimensional image to convert the image information on the respective scanning lines into one-dimensionally arranged image signals; second means for the temporary storage of said image signals including a plurality of information storages connected so that said image signals supplied from said first means to the information storage of the first stage are sequentially shifted to the information storages of the following stages; third means for the reconstruction of partial images including a plurality of shift registers provided corresponding to said information storages, said shift registers taking in said image signals from the corresponding information storages in accordance with the input order thereof to parallelly deliver plural-bit image signals; and fourth means for generating a first sampling signal which controls said second means so that said image signals from said first means are sampled through predetermined scanning lines for the supplying thereof to said second means and a second sampling signal which controls said third means so that said image signals from said second means are sampled at a predetermined interval for the supplying thereof to said third means, said fourth means including a control circuit for shifting the timing of the generation of at least one of said first and second sampling signals in timing with the end of the image scanning operation performed by said first means, whereby for the scannings repeatedly performed on the same image, the image signals relating to the sampled picture elements different from those in the previous scanning are supplied to said third means.

The above and other objects and features of this invention will be apparent from the following detailed description made in conjunction with the accompanying drawings, in which:

FIGS. 1A to 1G illustrate how different compressed images are obtained by selecting different sampling points;

FIGS. 5A to 5D illustrate the relation between the positions of the picture elements on an image and the picture elements stored in shift registers;

FIG. 6 shows in block diagram another example of the circuit arrangement of the sampling control unit;

FIGS. 7A to 7F illustrate how sampling points are selected on the original image;

First, for a better understanding of this invention, the problem of distortion in the compressed pattern obtained through sampling will be described referring to FIGS. 1A to 1G.

FIG. 1A shows a portion of the image which is obtained by sampling the image output signal of an image pickup device in synchronism with the reference clock pulses whose repetition period corresponds to one picture element and by converting information of the respective picture elements into binary or two-level signals. In FIG. 1, S indicates a picture element and a hatched area P denotes a characteristic pattern included in the image. Now, to simplify a pattern matching processing, a case will be considered where the sampling interval is four times expanded and one picture element is extracted from each of regions $S_1$, $S_2$, - - - - each consisting of 4×4 picture elements, and a compressed pattern constructed by the extracted picture elements is compared with the reference pattern. In this case, if the picture elements of the respective regions $S_1$, $S_2$, - - - - are numbered as shown in FIG. 1B and if the same-numbered picture elements are extracted respectively from these regions, different compressed patterns are obtained depending upon the selection of the specified picture element within each region, as shown in FIGS. 1C to 1F. FIG. 1C indicates a compressed image constructed by #1 picture elements extracted from the regions $S_1$, $S_2$, - - - -, FIG. 1D a compressed image of #3 picture elements, FIG. 1E a compressed image of #9 picture elements, and FIG. 1F a compressed image of #11 picture elements. The comparison of these compressed images with a reference or standard pattern shown in FIG. 1G shows that the difference between any one of the compressed images and the standard pattern is marked by crosses "X" and that the compressed image shown in FIG. 1F resembles the standard pattern to the closest extent.

Figure 2:
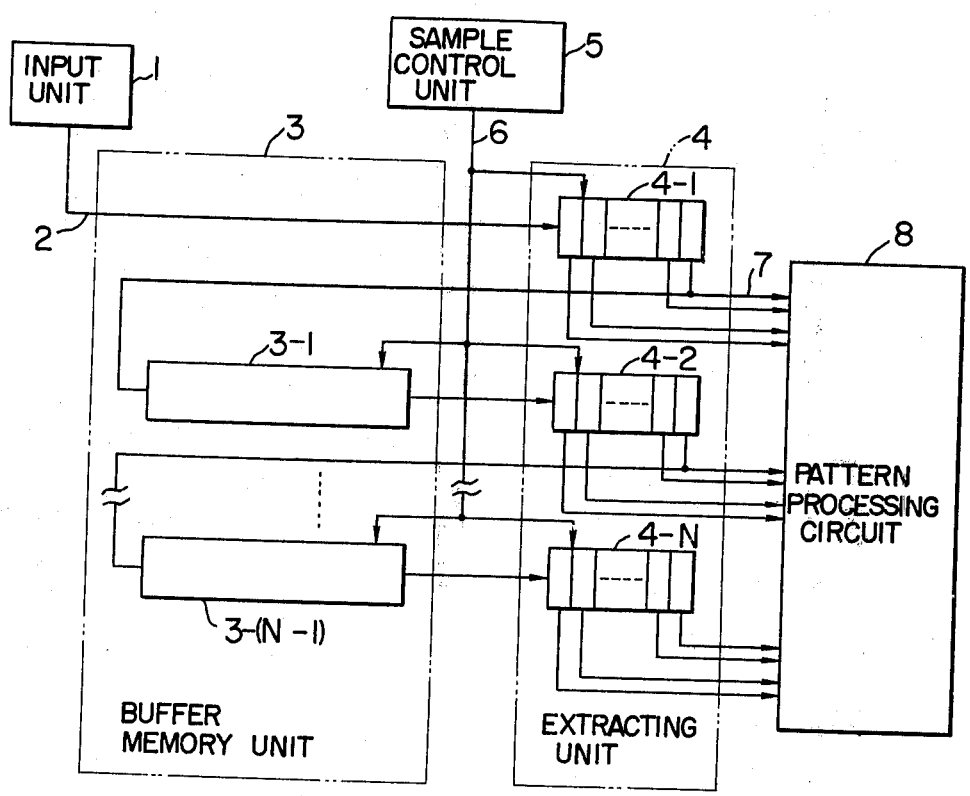
FIG. 2 shows in block diagram a compressed image producing system as one embodiment of this invention.

FIG. 2 shows a compressed image producing system according to one embodiment of this invention. The system comprises an image input unit 1 for converting the information of a two-dimensional image into one-dimensionally or time-sequentially arranged image signals 2 and delivering them, a buffer memory unit 3 for time-sequentially storing predetermined or sampled amounts of the image signals 2, a partial image extracting unit 4 for sequentially taking in a part of the image signals stored in the buffer memory unit 3 to produce two-dimensionally rearranged partial image signals 7, and a sampling control unit 5. Reference numeral 8 indicates a pattern processing circuit for processing the partial image signals 7. The pattern processing circuit 8 may be, for example, a pattern matching circuit for comparing the extracted partial images with the reference pattern. Also, the pattern processing circuit 8 may be replaced by any other circuit having desired functions, depending on the purposes of required information processing.

The input unit 1 includes therein a raster scanning image pickup device such as a TV camera and, if necessary, quantizing device which has an A-D converter for converting the video output signal of the image pickup device into a digital signal per picture element and a threshold circuit. Also, the input unit 1 may be a device which sequentially reads out image data previously stored in a memory and delivers them as the image signal 2.

The partial image extracting unit 4 includes a plurality of shift registers from which information can be taken out bit-by-bit. The unit 4 is constituted of N shift registers 4-1 to 4-N each of which has a memory capacity of M bits if it is desired to obtain a partial image consisting of M row points and N column points.

The buffer memory unit 3 is constituted of N-1 data storage devices such as shift registers 3-1 to 3-(N-1). These shift registers may be replaced by random access memories. The shift registers are connected in cascade so that the image signals 2 may be sequentially shifted through the registers 4-1, 3-1, 4-2, - - -, 3-(N-1) and 4-N in this order.

With this circuit configuration, the memory capacity of the shift registers 3-1 to 3-(N-1) is closely related to the kinds of images extractable from the unit 4, as described later, but it is here assumed for convenience of explanation that each of the registers 3-1 to 3-(N-1) has a memory capacity of L-M bits if each row of the image is composed of L picture elements.

Figure 3:
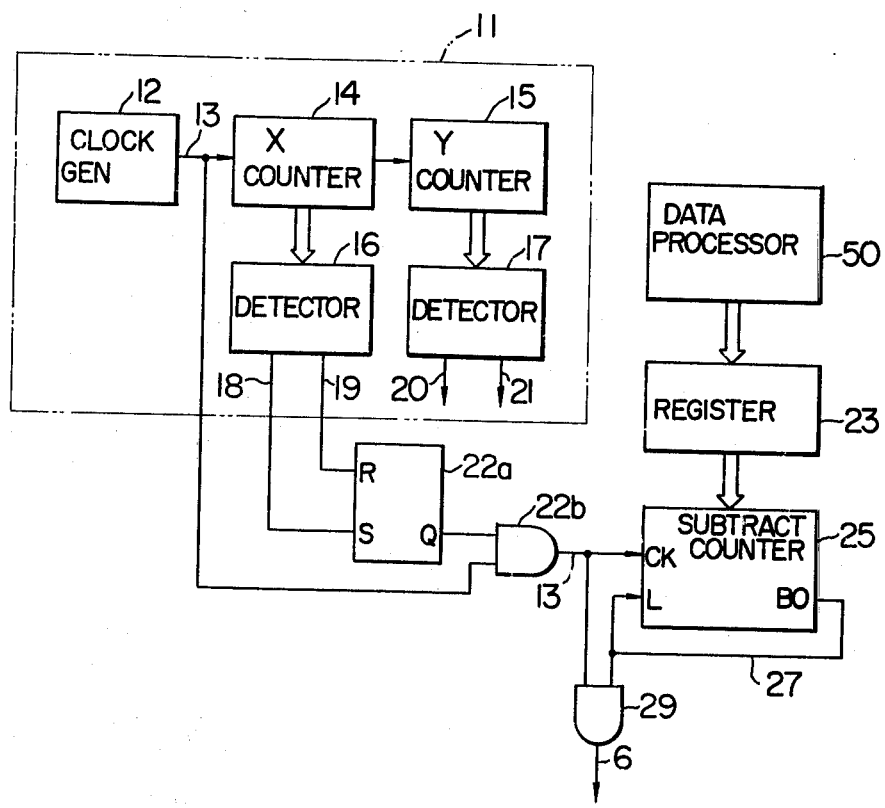
FIG. 3 shows in block diagram a concrete example of the sampling control unit used in the system of FIG. 2.

According to this invention, the sampling control unit 5 has a circuit arrangement, for example, shown in FIG. 3. In FIG. 3, reference numeral 11 indicates a control signal generating circuit which generates reference timing signals in synchronism with the raster scanning performed by the input unit 5.

The control signal generating circuit 11 includes a reference clock generator 12 delivers reference clock pulses 13 at a constant period corresponding to one picture element of the image, drives an abscissa or X counter 14 and therefore drives an ordinate or Y counter 15 as a result of the carrying operation of the counter 14. The X and Y counters 14 and 15 repeatedly count up to the count numbers respectively equal to the horizontal and vertical scanning times (including retrace or flyback periods). Detecting circuits 16 and 17 respectively detects that the contents of the counters 14 and 15 have reached predetermined counts, and they respectively deliver horizontal (X-) direction sampling start and end signals 18 and 19 and vertical (Y-) direction sampling start and end signals 20 and 21. Since these circuits are simple circuits for making a logic product, the detailed explanation thereof will be omitted here. Of these timing signals, the X-direction sampling start signal 18 is supplied to the set terminals of a flip-flop 22a and the X-direction sampling end signal 19 is supplied to the reset terminal of the flip-flop 22a. Accordingly, the flip-flop 22a is in its on-state only during the horizontal scanning period except the retrace or flyback period and enable a gate 22b for controlling the output of the reference clock generator 13 during the horizontal scanning period.

A register 23 serves to maintain the sampling interval. If the actual sampling interval is equal to m or corresponds to m clock pulses, the number m-1 is set in the register 23. The value m-1 for the sampling interval is taken in from a data processor 50 for controlling the whole pattern processing system such as an electronic computer which is outside the partial pattern extracting unit. This value m-1 may also be taken in through the manual operation of a switch by an operator. A counter 25 is a synchronous subtract counter which counts down each time it receives the reference clock pulse 13 from the gate 22b. When the contents of the counter 25 become zero, the borrow (BO) output signal 27 becomes "1". The borrow output signal 27 is supplied as a load (LD) signal to the counter 25 so that the counter 25 takes in the value m-1 from the register 23 in response to the next clock pulse 13. The borrow output signal 27 serves also as a control signal for controlling the gating of the reference clock pulse 13 by an AND gate 29. Accordingly, the AND gate 29 delivers one sampling signal 6 per the m reference clock pulses.

Again referring to FIG. 2, the sampling signal 6 is supplied as a shift pulse to the shift registers of the buffer memory unit 3 and the partial image extracting unit 4. The image signals 2 delivered from the input unit 1 are taken in every m picture elements by the shift register 4-1 and successively stored in the shift registers of the buffer memory unit 3.

Since the shift register 3-1 has a memory capacity of L-M bits and the shift register 4-2 has a memory capacity of M bits, these registers 3-1 and 4-2 in combination can store the picture element information of L bits. The number of the picture elements extractable from one scanning line in the X-direction of the original image is L/m and therefore the paired registers 3-1 and 4-2 can store the information of picture elements sampled from m scanning lines. Also, the comparison of the contents of the adjacent registers, e.g. registers 4-1 and 4-2, shows that at the moment when the picture element information of initial M bits sampled from the first scanning line is set in the register 4-2, the picture element information of initial M bits sampled from the (m+1)th scanning line is just set in the register 4-1. In other words, the corresponding bits of the adjacent register 4-1 and 4-2 store the information of picture elements positioned apart from each other by a distance m in the Y-direction on the original image. Similarly, the register 4-3 adjacent to the register 4-2 stores the information of picture elements distanced by m in the Y-direction on the original image from the picture elements whose information is stored in the register 4-2. Consequently, by taking out the picture element or partial image signals 7 from the respective bit positions of the registers of the partial image extracting unit 4, the pattern processing circuit 8 can successively produce partial images in which the image supplied to the input unit 1 is compressed by a factor of 1/m in both the X- and Y- directions.

Figure 4:
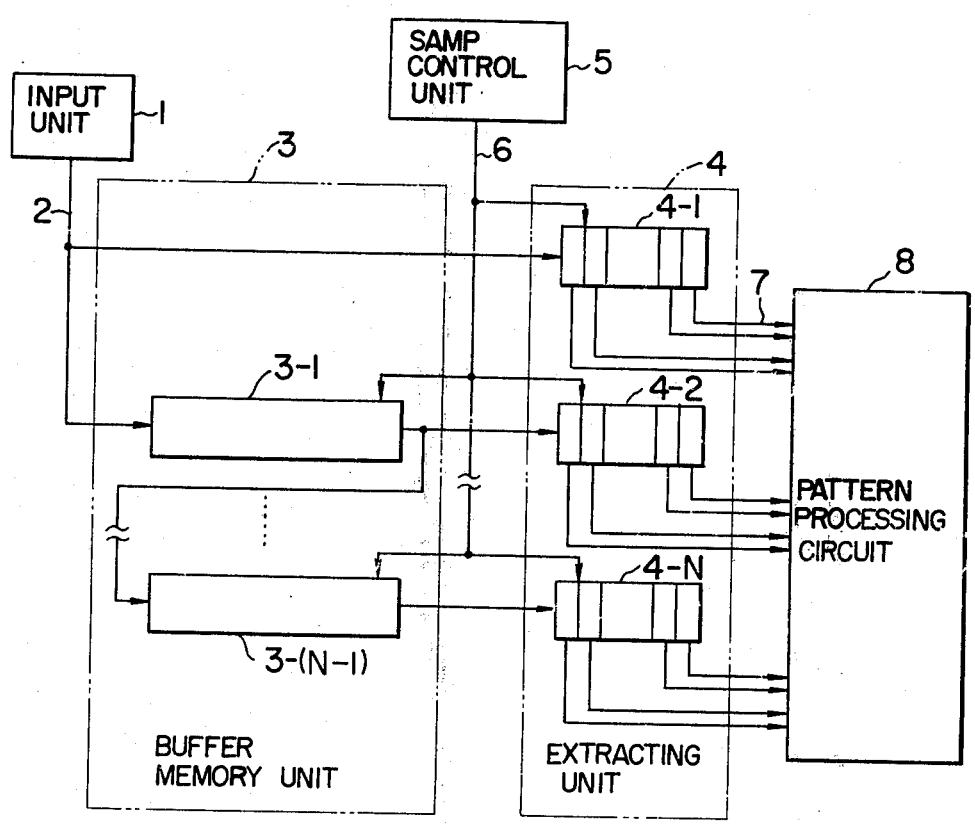
FIG. 4 shows in block diagram a compressed image producing system as another embodiment of this invention.

FIG. 4 shows a system according to another embodiment of this invention. In this embodiment, the shift register 3-1 to 3-(N-1) of the buffer memory unit 3 is connected in cascade so that the image signals 2 may be directly supplied from the input unit 1 to the first stage shift register 3-1 and that the output of the shift register 3-1 is directly supplied to the second stage shift register 3-2.

It should be noted that if the length of each of the shift register 3-1 to 3-(N-1) is made equal to the scanning length L in the X-direction, each register can store the picture element information sampled from m scanning lines, as described with the system shown in FIG. 2, and the information of picture elements positioned apart from each other by a distance m in both the X-and Y-direction is sequentially sent to the partial image extracting unit 4.

With the aid of FIG. 5, description will now be made of how the picture element information is stored in the buffer memory unit 3.

FIG. 5A shows numbered picture elements arranged two-dimensionally on the image to be scanned. In this example, it is seen that L=100.

FIGS. 5B and 5C show respectively the data contents of the shift registers 3-1 to 3-3 in the system of FIG. 4 at a certain instant. FIG. 5B illustrates the case where the sampling interval is m=2 and FIG. 5C illustrates the case of the sampling interval m=3. As is seen in FIG. 5C showing the case of m=3, even though L is not divisible by m, the length of m 33 L corresponding to m scanning lines is divisible by m so that no problem of excess and scantiness will be caused. The output of the adjacent registers are exactly matched in the vertical direction. In the case where L is not divisible by m, the point to be sampled is shifted in the X-direction on every scanning line.

As seen in FIG. 5B, the buffer memory unit 3 stores two groups of image data, i.e. sampling data (SAMPL-1) selecting a picture element "000" as the sampling start point and sampling data (SAMPLE-2) selecting a picture element "100" as the sampling start point. The partial images represented by the two groups of image data are alternatively sent into the partial image extracting unit 4. From FIG. 5C, it is understood that three groups of pattern data selecting picture elements "002", "101" and "200" as the sampling start points are periodically sent from the buffer memory unit 3 to the partial image extracting unit 4. Namely, if each of the shift registers constituting the buffer memory unit 3 has a memory capacity larger than the amount of sampling data extractable from one scanning line, more than one compressed image having different sampling start points can be extracted through one image scanning period.

The aboved-described method enables only m ways among the m x m ways of sampling (m: sampling interval). However, if it is desired to use all the m x m ways of sampling, the circuit arrangement of the sampling control unit 5 should be designed as shown in FIG. 6.

The circuit shown in FIG. 6 operates in such a manner that a image is repeatedly scanned and the initial sampling point is shifted on every scanning operation.

The data processing unit 50 sets a value m-1 smaller by 1 than the sampling interval m, in the register 23 and also delivers a start signal 31 for the partial image extracting unit. The start signal 31 renders a flip-flop 32 in its set state. The output signal 33 of the flip-flop 32 is supplied to the J terminal of a J-K flip-flop 34 and to the load terminal (LD) of a subtract counter 38. The J-K flip-flop 34 and the subtract counter 38 operate in response to the Y-direction sampling end signal 21 supplied from the control signal generator 11 to the clock terminals (CK) thereof. The Y-direction sampling end signal 21 is the same as that described in connection with FIG. 3. Upon delivery of the Y-direction sampling end signal 21 from the control signal generator 11, the subtract counter 38 receives the initial value m-1 from the register 23. The subtract counter 38 performs its subtracting operation each time the Y-direction sampling end signal 21 is generated. When the contents of the counter 38 become zero, it delivers an end signal 39 from the borrow terminal (BO).

The J-K flip-flop 34 is set by the first Y-direction sampling end signal 21 to deliver a signal 35. The K terminal of the J-K flip-flop 34 receives the logical AND combination of the signal 35 and the end signal 39 through an AND gate 37. Thus, the J-K flip-flop 34 is reset and delivers a zero output when the next Y-direction sampling end signal 21 is generated, and the data processor 50 can detect the completion of the partial image extracting operation by detecting the change in the state of the output signal 35.

Only when both the X- and Y-direction sampling start signals 18 and 20 are simultaneously delivered, an AND gate 30 delivers the output signal 30S. The signal 35 is supplied to the reset terminal of the flip-flop 32 through an AND gate 36 which receives the signal 30S as one of its input. Accordingly, by the first signal 35 generated after the J-K flip-flop 34 has been set, the flip-flop 32 is reset so as to prevent the subtract counter 38 from again initializing. The subtract counter 38 uses the output 33 of the flip-flop 32 as a load instruction input.

The output signal 30S of the AND gate 30 is also supplied as a selection signal (SEL) to a data selector 40 and further to the load terminal of the counter 25 through an OR gate 41. The data selector 40 selects the input A or the contents of the counter 38 when the selection signal SEL is "1" while it selects the input B or the contents of the register 23 when the signal SEL is "0". The selected data are then supplied to the counter 25.

Since the signal 30s is the logical product of the X- and Y-direction sampling start signals 18 and 20, the signal 30s becomes "1" only at the moment when the sampling starts at the left above corner and at such an occasion the contents of the counter 38 are set in the counter 25. The counter 25 performs its subtracting operation each time it receives a clock pulse 13 and the counter 25 delivers a borrow signal 27 when its contents equal zero. The borrow signal 27 is supplied to the AND gate 29 to cause the clock signal 13 to be delivered as a sampling signal 6. The borrow signal 27 is also supplied as a load signal to the counter 25 through the gate 41. Since the signal SEL is already "0" when the borrow signal 27 is delivered, the value to be loaded in the counter 25 is the contents of the register 23, i.e. m-1.

With the above-described constitution, sampling is performed sequentially at an interval of m, with the initial sampling point selected on the basis of the contents of the counter 38. The contents of the counter 38 are decreased by unity each time the scanning operation covers the whole image and the sampling is continuously performed during the time for which the whole image is scanned m times repeatedly. Therefore, all the m × m compressed patterns with different m × m sampling start points can be obtained after the series of sampling operations described above.

In the case of m=3, if the first image scanning is as shown in FIG. 5C as described above, the contents of the buffer memory unit 3 at the time of the second image scanning are as shown in FIG. 5D.

If the combined length of the registers 3-1 and 4-2 in the system shown in FIG. 2 or the length L of the register 3-1 in the system shown in FIG. 4 is divisible by the sampling interval m, the sampled images obtained by the two successive scanning operations of the whole image are shifted by one picture element in the Y-direction while they are kept registered in the X-direction, as seen from the comparison of FIG. 5B with FIG. 5A.

On the other hand, if the length L is not divisible by m, the corresponding sampled images have a shift also in the X-direction, as apparent from the comparison of FIG. 5C with FIG. 5A.

FIGS. 7A, 7B and 7C respectively show how the sampling points are orderly located in a single scanning of the whole image for m=2, 4 and 5, where the length L of the register is set at a value which is not divisible by m. In FIGS. 7A to 7C, the same numbered sampling points or picture elements are loaded side by side in the registers 3-1 to 3-N of the partial image extracting unit 4 and the non-numbered picture elements are not extracted in the scanning. In this way, if the sampling points are distributed in both the X- and Y-directions, there will increase the probability that an optimum sampled image is obtained by a single scanning of the original image.

Therefore, if L is selected as an integer such that it is slightly smaller than the number of picture elements corresponding to one scanning line and such that it is not divisible by a natural number equal to or smaller than the sampling interval m, a partial image can be extracted for any sampling interval m by distributing the sampling points in the X-direction during a single scanning of the whole image. In this case, the reference clock pulse 13 supplied to the counter 25 and the gate 29 are so controlled by the control signal generator 11 that L pulses may be allotted to one scanning line.

In the case where the length in the Y-direction of the image to be scanned is convered by M scanning lines and if the number K of the actual scanning lines used to take out the image signal 2 is smaller than M and set indivisible by a natural number equal to or smaller than m, the initial sampling point can be shifted from one sampled image to another by using a circuit the same circuit as the circuit shown in FIG. 6 except the omission of the counter 38 and the data selector 40, so that all the sampled images can be obtained by scanning the whole image m times. FIGS. 7D and 7E show the distribution of sampling points for the second image scanning in a similar scanning operation as above in the cases of m=2 and 4, respectively.

Figure 8:
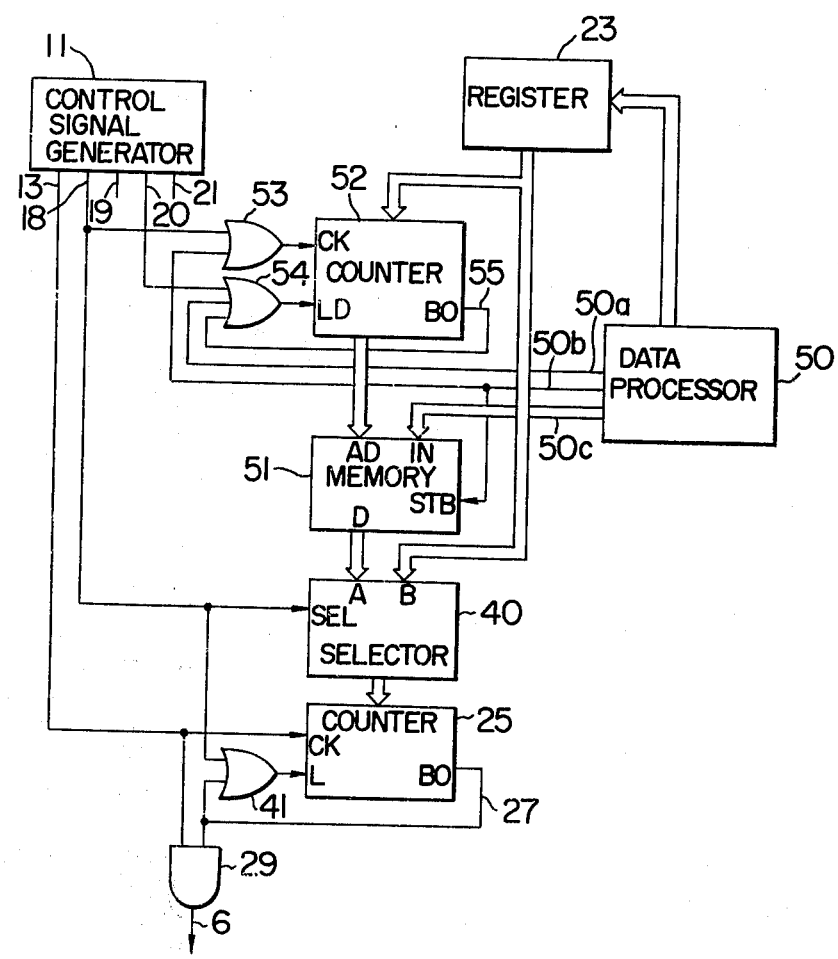
FIG. 8 shows in block diagram a further example of the circuit arrangement of the sampling control unit.

If the number L of picture elements constituting one scanning line is not limited and if the initial sampling points 0, 1, 2 and 3 of the m scanning lines are arbitrarily selected as shown in FIG. 7F, a circuit arrangement as shown in FIG. 8 can be used as the sampling control unit 5.

In the circuit arrangement shown in FIG. 8, the register 23 for storing the value m-1 smaller by unity than the sampling interval m, the data processor 50, the data selector 40, the substract counter 25 and the gate 29 for controlling the supplying of the sampling pulse 6 are all the same as those in FIG. 6.

A random access memory 51 serves to store in its addresses #0 to #-1 the data representing the amounts of shifts of the initial sampling points in the respective scanning lines and the addresses of the data to be accessed are specified by a subtract counter 52. Data are previously written in the random access memory 51 by the data processor 50. The data processor 50 first sets the data m−1 in the register 23 and delivers a clock pulse 50a to load the value m−1 from the register 23 into the counter 52. The data processor 50 then delivers a clock pulse 50b and data 50c to be written in the memory 51. The clock pulse 50b is supplied through an OR gate 53 to the clock terminal CK of the counter 52 and also to the strobe terminal STB of the memory 51 so as to be used as a writing instruction signal. The counter 52 performs its subtracting operation each time it receives the clock pulse 52b, so that the data supplied from the data processor 50 are successively written in the addresses of the memory 51 corresponding to the contents of the counter 52. During the image extracting operation, the counter 52 receives as a load instruction signal the Y-direction sampling start signal 20 delivered by the control signal generator 11 through an OR gate 54 and also receives at its clock terminal CK the X-direction sampling start signal 18 through the OR gate 53. At the time of the first scanning in the X-direction, the value m−1 is loaded from the register 23 into the counter 52 and thereafter this value is decreased by unity each time one horizontal scanning is completed. When the contents of the counter 52 become zero, a borrow signal 55 is delivered from the counter 52. The borrow signal 55 is supplied to the load terminal LD of the counter 52 through the OR gate 54 so that the contents of the counter 52 are restored to the value m−1. Thus, the counting operation having the counting period m is repeated. The memory 51 supplies as A data to the data selector 40 the data having the addresses coincident with the contents of the counter 52. The A data is loaded in the counter 25 through the data selector 40 each time the X-direction sampling start signal 18 is generated. In the counter 25, the value supplied form the memory 51 and thus loaded therein is decreased by unity each time the counter 25 receives a reference clock pulse 13. And if the value becomes zero, the counter 25 takes in the value m−1 of the register 23 having been supplied as B data to the data selector 40, so that a counting operation with counting period m is performed. Accordingly, the gate 29 which is enabled by the borrow signal 27 of the counter 25, successively delivers m trains of pulses in which the timings of the generation of the initial pulses in the pulse trains for the respective scanning lines are different from each other.

According to the above-described systems, plural groups of sampled point data are successively stored in the buffer memory unit 3 and plural kinds of compressed images are successively and periodically taken in the partial image extracting unit 4 during the scanning of the whole original image, the sampling points for one compressed image being shifted from the corresponding sampling points for another compressed image.

Next, as another embodiment of this invention, a system will be described in which a set of sampled points are obtained by the scanning of the whole image and n kinds of compressed images having different patterns of sampled points are extracted by scanning the whole image n times.

Figure 9:
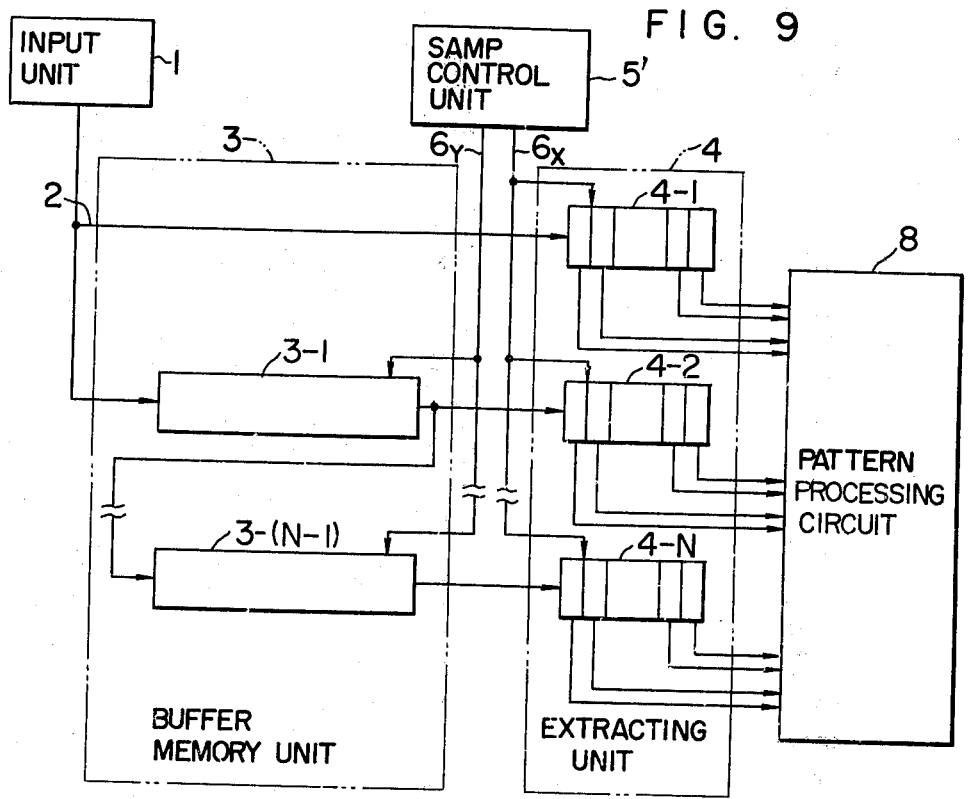
FIG. 9 shows in block diagram a compressed image producing system as a further embodiment of this invention.

In this case, as shown in FIG. 9, a sampling control unit 5' is used which generates a Y-direction sampling signal 6Y for selecting every m-th scanning line on the image and an X-direction sampling signal 6X for extracting every m-th sampling point on the selected scanning line. The timing of the generation of the sampling signal 6Y and/or the sampling signal 6X is varied between successive image scannings. The sampling signal 6Y is supplied as a shift pulse to the registers 3-1 to 3-(N-1) of the buffer memory unit 3 so that the respective registers successively take in the data of the L picture elements included on every m scanning lines of the image. The sampling signal 6X, on the other hand, is generated during the period for which the signal 6Y is generated, and supplied as a shift pulse to the shift registers 4-1 to 4-N of the partial image extracting unit 4. The shift register 4-1 takes in the picture element data by sampling the image signal 2 delivered from the input unit 1 at an interval m. The shift registers 4-2 to 4-N take in the picture element data stored in the buffer memory unit 3 through the sampling at an interval of m. As a result, partial compressed images consisting of shifted image regions can be obtained from the partial image extracting unit 4.

Figure 10:
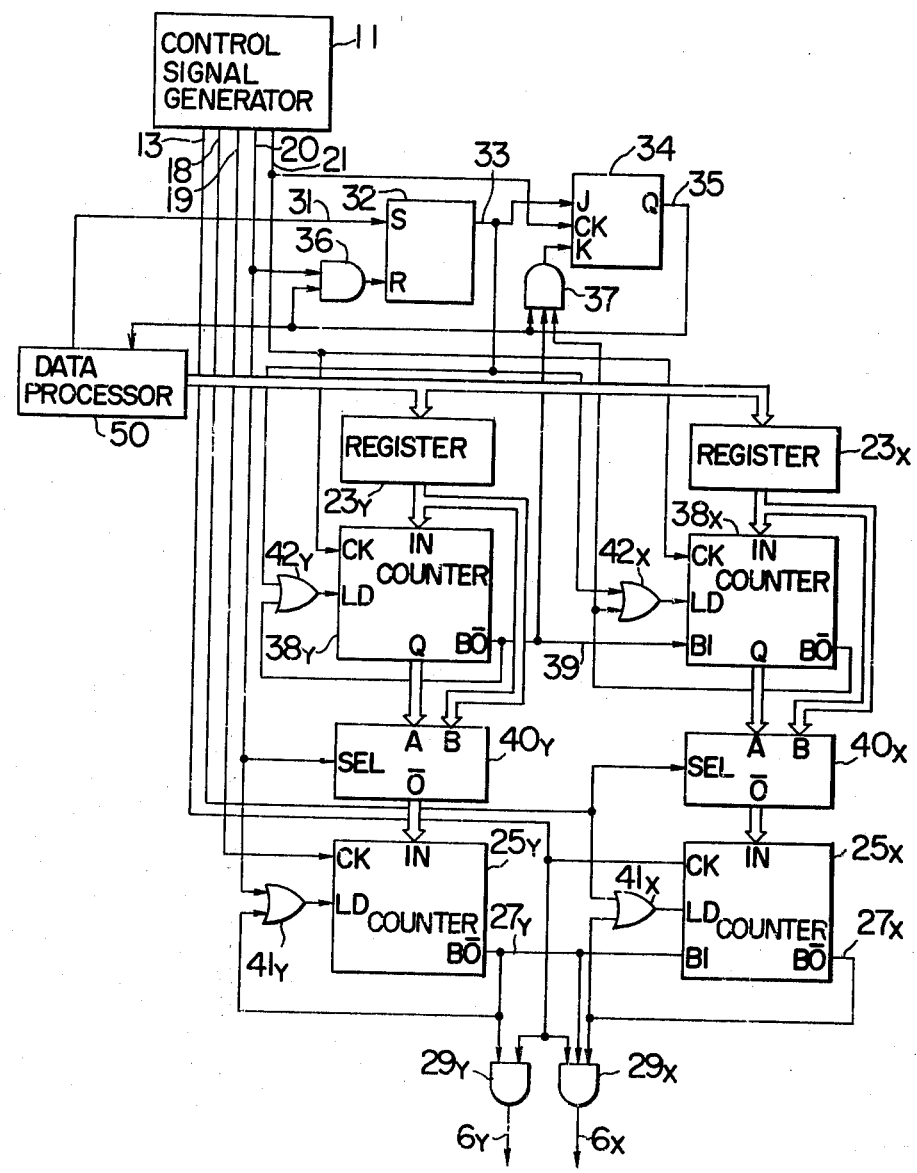
FIG. 10 shows in block diagram a concrete example of the circuit arrangement of the sampling control unit used in the system of FIG. 9.

FIG. 10 shows an example of the sampling control unit 5' used in the system of FIG. 9. The circuit arrangement shown in FIG. 10 is similar to that shown in FIG. 6 and for the simplification of description the equivalent parts and circuit elements are indicated by the same reference numerals with or without suffixes X and Y.

The circuit portion including the data processor 50, the flip-flop 32 and the J-K flip-flop 34 is the same as in FIG. 6 and the description of this portion will be omitted. Registers 23Y and 23X respectively serve to hold the vertical and the horizontal sampling intervals $m_Y$ and $m_X$ and actually holds the values $m_Y-1$ and $m_X-1$ which are respectively smaller by unity than the actual sampling intervals $m_Y$ and $m_X$ and supplied from the data processor 50. Subtract counters 38Y and 38X operate in response to the Y-direction sampling end signal 21 delivered by the control signal generator 11 and serve to determine the position of the initial sampling point for each image scanning. The subtract counters 38Y and 38X receive the contents $m_Y-1$ and $m_X-1$ of the registers 23Y and 23X in response to the load instruction signal 33 supplied from the flip-flop 32 through OR gates 42Y and 42X upon starting of the pattern processing operation. The contents of the subtract counter 38Y are supplied as input data A to a data selector 40Y and the contents of the subtract counter 38X are used as the input data A to a data selector 40X.

The data selector 40Y uses the Y-direction sampling start signal 20 as a selection instruction signal and delivers the input data A when the signal 20 is "1" and the input data B or the contents of the register 23X when the signal 20 is "0". The output of the data selector 40Y is supplied to a counter 25Y for defining a Y-direction sampling interval. The counter 25Y performs its subtracting operation each time the X-direction sampling end signal 19 as a clock input CK is generated, and the counter 25Y takes in the output of the data selector 40Y when there is a load input LD. The load input terminal LD receives though an OR gate 41Y the Y-direction sampling start signal 20 and the borrow signal 27Y from the counter 25Y. Accordingly, the counter 25Y counts down from the initial value or the contents of the counter 38Y per horizontal scanning line and delivers the borrow output 27Y to take in the value of the register 23Y when the contents of the counter 25Y become zero. During the period for which the borrow output 27Y is at the level "1", a gate 29Y is enabled to delivery the reference clock pulse 13 as the sampling signal 6Y. The contents of the counter 38Y are counted down in accordance with the Y-direction sampling end signal 21, and the value $m_Y-1$ of the register 23Y is again taken in accordance with the borrow signal when the contents of the counter 38Y become zero. Consequently, the sampling signal 6Y has a period $m_Y$ and the timing of the generation thereof is shifted between the successive image scannings.

On the other hand, the counter 38X performs its subtracting operation in response to the Y-direction sampling end signal 21 only when the borrow output 39 supplied as an input to the terminal BI is at the level "1". Namely, the counter 38X counts down at a rate equal to $1/m_Y$ of the rate at which the counter 38Y counts down. The contents of the counter 38X are used as the input data A to the data selector 40X. The data selector 40X performs its selection instruction in accordance with the X-direction sampling start signal 18. Also, since the signal 18 is supplied to the load instruction input terminal LD of the counter 25X for counting pulses for the X-direction sampling interval through an OR gate 41X, the contents of the counter 38X are set in the counter 25X in the timing in which the counter 25X receives the clock pulses 13.

The counter 25X performs its subtracting operation in accordance with the clock pulses 13 during the period for which the borrow output 27Y of the counter 25Y serving as the input to the BI terminal is at the level "1", and when the contents of the counter 25Y become zero the borrow output 27X becomes "1". At this time, the gate 29X delivers the X-direction sampling signal 6X. The borrow output 27X is supplied to the load input terminal LD of the counter 25X through the OR gate 41X. During the scanning in the X-direction, the signal SEL of the selector 40X is "0" and the input B or the value $m_X-1$ of the register 23X is set in the counter 25X. Accordingly, the counter 25X repeats its counting operation at a period of $m_X$, and whenever its contents become zero the borrow signal 27X is delivered to cause the gate 29X to deliver the sampling pulse 6X.

When the contents of the counter 38X become zero, all the inputs of the AND gate 37 are "1". The J-K flip-flop 34 is reset by the next Y-direction sampling end signal 21 so that the operating signal 35 becomes zero to finish the series of pattern processing operations.

Figure 11A:
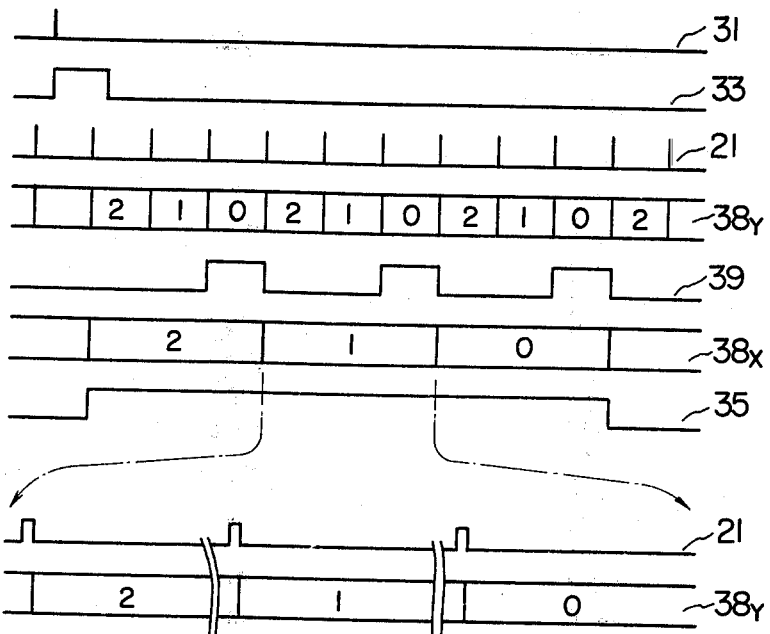
FIGS. 11A to 11C are time charts for explaining the operation of the circuit of FIG. 10.
Figure 11B:
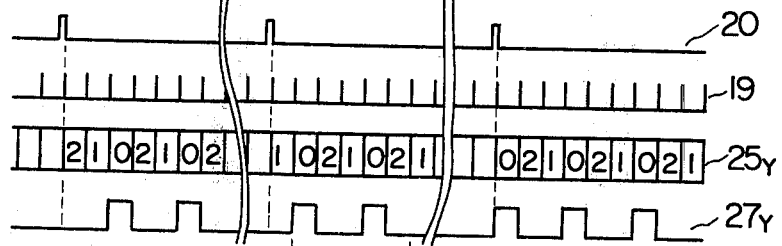
Figure 11C:
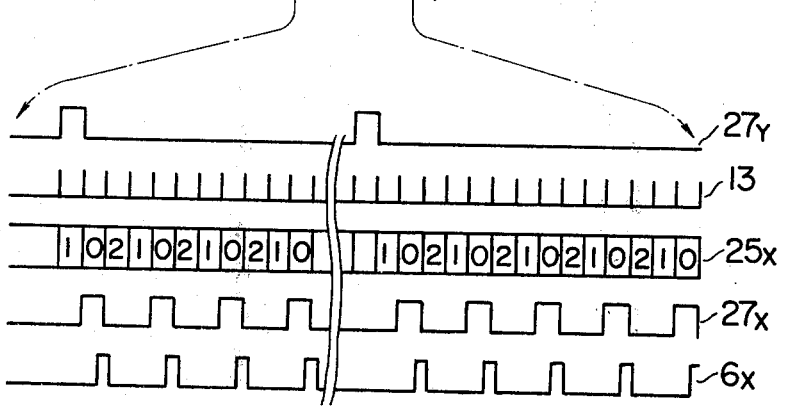

FIGS. 11A, 11B and 11c are time charts useful in explaining the operation of the system described above, respectively corresponding to the operations of the counters 38X and 39X, the operation of the counter 25Y and the operation of the counter 25X.

Figure 12:
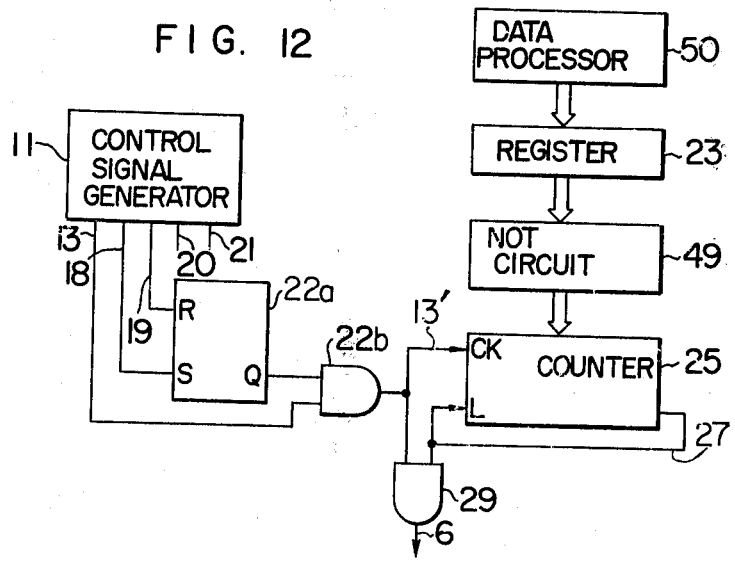
FIG. 12 shows in block diagram a furthermore example of the sampling control unit.

In the above embodiments, subtract counters are exclusively used, but the subtract counters may be replaced by add counters. For example, a circuit which is constructed by simply replacing the subtract counter in the circuit in FIG. 3 by an add counter, is shown in FIG. 12. Similar modifications can be applied equally to the circuits in FIGS. 6, 8 and 10 to obtain the same results, but description will be concentrated on the circuit in FIG. 12 alone. As shown in FIG. 12, the output of the register 23 holding the sampling interval $m-1$ is inverted by a NOT circuit 49 so as to generate the complement with respect to the value which the contents of the counter 23 represent. The synchronous add counter 25 delivers a carry output 27 of "1" when all the bits thereof are "1", and the counter 25 takes in an input in the timing of the following clock pulses 13'. Therefore, the counter 25 performs its counting operation with a period of m. For example, if each of the counter 25 and the register 23 has 4 bits and if $m=4$, the value $m-1$ is "0011" and the inverted value or complement thereof is "1100" equivalent to 12 in decimal notation. Since the counter 25 delivers the carry output when the contents thereof are "1111" equivalent to 15 in decimal notation, the counting operation can be repeated at a period of 4, that is, 12, 13, 14, 15; 12, 13, 14, 15; 12, 13, ---.

It should be noted that the contents of the registers 22 and 23 for holding the sampling intervals may also be set by an external control unit.

As described above, according to this invention, the problem of distortions in the compressed patterns due to the shifts of the positions of the sampling points can be solved so that it is possible to extract an optimum compressed image suitable for the comparison with a reference pattern.

The embodiments of this invention have been described and shown in conjunction with the systems for processing the video signal from the image pickup device. However, this invention is by no means limited to those embodiments but permits of numerous variations and alterations within its scope. Namely, this invention can be widely applied to pattern information processing system for processing two-dimensionally arranged magnetic or mechanical information. For the application where the input signal has more than two values, the registers of the buffer memory unit and of the image extracting unit should be parallel connected in accordance with the number of the data expressible by a single digit. Moreover, in the case where an analog input signal is used, information storage elements may be used which are substituted for the shift registers and can sequentially send forth the analog quantity in accordance with clock pulses. Further, if the input signal is of digital quantity, the shift register may be replaced by a random access memory and it is possible to design a circuit in which the signals are sequentially sent to the registers of the image extracting unit in the order of reception as inputs and the read signals are sequentially written in the memory of the following stage.

What is claimed is:

1. A compressed image producing system comprising:
    a first means for successively scanning a two-dimensional image to convert the image information on the respective scanning lines into picture element signals in synchronism with reference clock pulses;
    second means operated by first sampling instruction pulses for the temporary storage of said image signals including a plurality of stages of information storages connected so that said image signals supplied from said first means to a first stage of the information storages are sequentially shifted to following stages of the information storages;

third means operated by second sampling instruction pulses for construction of partial images including a plurality of shift registers provided corresponding to said information storages, said shift registers taking in said image signals from the corresponding information storages in accordance with the input order thereof to parallelly deliver plural-bit image signals; and fourth means for generating said reference clock pulses, said first sampling instruction pulses which control said second means so that said image signals from said first means are sampled through predetermined scanning lines for the supplying thereof to said second means and said second sampling instruction pulses which control said third means so that said image signals from said second means are sporadically sampled at a predetermined interval for the supplying thereof to said third means, said fourth means including a control circuit for shifting the timing of the generation of at least one of said first and second sampling instruction pulses in timing with the end of the image scanning operation performed by said first means, whereby for the scannings repeatedly performed on the same image, the image signals relating to the sampled picture elements different from those in the previous scanning are supplied to said third means.

2. A compressed image producing system comprising:

first means for converting a two-dimensional image into one-dimensionally arranged picture element signals and delivering the picture element signals sequentially in synchronism with reference clock pulses;

second means for storing picture element signals sporadically sampled from the output of said first means by first sampling instruction pulses;

third means for taking-in a part of said picture element signals stored in said second means by second sampling instruction pulses to parallelly deliver image signals composing a two-dimensionally compressed image; and fourth means for supplying said reference pulses to said first means and for supplying said first and second sampling instruction pulses to said second and third means, respectively, said first and second sampling instruction pulses being produced by selective modification of said reference pulses so that the picture element signals relating to plural sets of sampling points allotted on said two-dimensional image are successively supplied to said third means through said second means, the respective sampling point sets having different sampling start positions and the sampling points of each set being allotted on said two-dimensional image at a predetermined horizontal and vertical interval.

3. A compressed image producing system comprising:

first means for successively scanning a two-dimensional image to convert the image information on the respective scanning lines into picture element signals and delivering the picture element signals sequentially in synchronism with reference clock pulses;

second means operated by first sampling instruction pulses, whose repetition period is longer than that of said reference clock pulses and shorter than the period of one scanning line for sporadically taking in from said respective scanning lines and temporarily storing a predetermined amount of said picture element signals supplied from said first means, said second means including a plurality of stages of data storages connected so that the picture element signals in a first stage of said data storages are sequentially shifted to following stages of said data storages, each of said data storages having a capacity corresponding to the number of the picture elements included in said one scanning line;

third means operated by second sampling instruction pulses whose generation timing is equal to that of said first sampling instruction pulses for construction of a two-dimensional compressed image signal including a plurality of shift registers provided corresponding to said data storages, each of said shift registers taking in said picture element signals from the corresponding data storage in accordance with the input order thereof to parallelly deliver plural-bit image signals which compose said compressed image; and fourth means for supplying said reference clock pulses to said first means and for supplying said first and second sampling instruction pulses to said second means and said third means, respectively, whereby each of said data storages stores plural groups of picture element signals sampled through the different scanning lines and image signals composing different compressed images are periodically delivered from said third means.

4. A compressed image producing system comprising:

first means for successively scanning a two-dimensional image to convert the image information on the respective scanning lines into picture element signals and delivering the picture element signals sequentially in synchronism with reference clock pulses;

second means operated by first sampling instruction pulses whose repetition period is longer than that of said reference clock pulses for sporadically taking in and temporarily storing predetermined amount of said picture element signals supplied from said first means, said second means including a plurality of stages of data storages;

third means operated by second sampling instruction pulses whose repetition period is equal to that of said first sampling instruction pulses for construction of a two-dimensional compressed image signal including a plurality of shift registers provided corresponding to said data storages, said data storages and said shift registers being connected so that the picture element signals in the data storage of the first stage are sequentially shifted to the data storages of the following stages through the corresponding shift registers and respective pairs of said data storages and said shift registers have a total capacity corresponding to the number of the picture elements included in said one scanning line, each of said shift registers parallelly delivering plural-bit image signals which compose said compressed image; and fourth means for supplying said reference clock pulses to said first means and for supplying said first and second sampling instruction pulses to said second means and said third means whereby each of said data storages stores plural groups of picture element signals sampled through the different scanning lines and image signals composing different compressed images are periodically delivered from said third means.

5. A compressed image producing system according to any one of claims 3 or 4, wherein said fourth means includes;
- means for generating said reference clock pulses, said picture element signals being delivered from said first means in response to said reference clock pulses;
- means for generating a first control signal and a second control signal when the first picture element and the last picture element in the image are scanned, respectively;
- a first counter means for holding data of the sampling start position in the image, said data being changed in response to said second control signal; and
- a second counter means responsive to said reference clock pulses for delivering said first and second sampling instruction pulses at a predetermined interval, the first one of said first and second sampling instruction pulses being delivered when the number of said reference clock pulses generated after the first control signal is generated corresponds to the data of said first counter means;
- whereby said second means takes in said picture element signals in response to said first sampling instruction pulses so that each time the scanning is performed at the image repeatedly, picture element signals different from the preceding scanning are stored in said second means.

6. A compressed image producing system according to any one of claims 3 or 4, wherein said fourth means comprises:
- means for generating said reference clock pulses, said picture element signals being delivered from said first means in response to said reference clock pulses;
- means for generating a control signal in synchronism with the start of respective horizontal scanning operation performed by said first means;
- means for storing data representative of different sampling start positions and for periodically reading out the data one by one in response to said control signal; and
- a counter means for delivering said first and second sampling instruction pulses at a predetermined interval, the first one of said first and second sampling instruction pulses being delivered when the number of said reference clock pulses generated after the control signal is generated corresponds to the data of said counter means;
- whereby said second means takes in said picture element signals in response to said first sampling instruction pulses so that the sampling start positions of the respective picture element groups stored in the second means are different between the scanning lines.

* * * * *